(12) United States Patent
Wisnia

(10) Patent No.: US 7,898,386 B2
(45) Date of Patent: Mar. 1, 2011

(54) CONTROL DEVICE FOR VEHICLES

(75) Inventor: Jack Wisnia, Dollard-des-Ormeaux (CA)

(73) Assignee: DEI Headquaters Inc., Vista, CA (US)

( * ) Notice: Subject to any disclaimer, the term of this patent is extended or adjusted under 35 U.S.C. 154(b) by 934 days.

(21) Appl. No.: 11/079,468

(22) Filed: Mar. 15, 2005

(65) Prior Publication Data

US 2006/0211368 A1 Sep. 21, 2006

(51) Int. Cl.
*B60R 25/10* (2006.01)
(52) U.S. Cl. ............... 340/5.62; 340/815.42; 341/27
(58) Field of Classification Search ........... 340/5.61, 340/5.62, 10.1, 815.48, 815.5, 815.42, 815.55, 340/815.62; 341/22
See application file for complete search history.

(56) References Cited

U.S. PATENT DOCUMENTS

| 3,657,720 | A | * | 4/1972 | Avdenko et al. | 290/38 C |
|---|---|---|---|---|---|
| 4,056,701 | A | * | 11/1977 | Weber | 200/314 |
| 4,674,454 | A | | 6/1987 | Phairr | |
| 4,866,434 | A | * | 9/1989 | Keenan | 340/825.72 |
| 4,928,778 | A | | 5/1990 | Tin | |
| 5,654,688 | A | * | 8/1997 | Allen et al. | 340/426.17 |
| 5,719,551 | A | | 2/1998 | Flick | |
| 6,011,460 | A | | 1/2000 | Flick | |
| 6,049,268 | A | | 4/2000 | Flick | |
| 6,140,938 | A | | 10/2000 | Flick | |
| 6,140,939 | A | | 10/2000 | Flick | |
| 6,144,315 | A | | 11/2000 | Flick | |
| 6,243,004 | B1 | | 6/2001 | Flick | |
| 6,249,216 | B1 | | 6/2001 | Flick | |
| 6,275,147 | B1 | | 8/2001 | Flick | |
| 6,297,731 | B1 | | 10/2001 | Flick | |
| 6,320,514 | B1 | | 11/2001 | Flick | |
| 6,346,876 | B1 | | 2/2002 | Flick | |
| 6,392,534 | B1 | | 5/2002 | Flick | |
| 6,424,056 | B1 | * | 7/2002 | Irvin | 307/10.1 |
| 6,507,786 | B2 | | 1/2003 | Flick | |
| 6,509,839 | B2 | * | 1/2003 | Nagatuska | 340/691.1 |
| 6,509,868 | B2 | | 1/2003 | Flick | |
| 6,512,465 | B2 | | 1/2003 | Flick | |
| 6,512,466 | B2 | | 1/2003 | Flick | |
| 6,522,267 | B2 | | 2/2003 | Flick | |
| 6,529,124 | B2 | | 3/2003 | Flick | |
| 6,561,151 | B1 | | 5/2003 | Wisnia et al. | |
| 6,567,012 | B1 | | 5/2003 | Matsubara et al. | |
| 6,587,052 | B1 | | 7/2003 | Flick | |
| 6,606,561 | B2 | | 8/2003 | Flick | |
| 6,624,758 | B1 | | 9/2003 | Omata et al. | |
| 6,693,563 | B2 | | 2/2004 | Flick | |

(Continued)

*Primary Examiner* — Brian A Zimmerman
*Assistant Examiner* — Yong Hang Jiang
(74) *Attorney, Agent, or Firm* — Ogilvy Renault LLP

(57) ABSTRACT

There is described a remote controller for a vehicle. A storage module stores control data to be transmitted to an in-vehicle Transceiver. A transceiver switch has a transmit mode to transmit a data signal to the in-vehicle transceiver and a receive mode to listen for an acknowledgement signal from the in-vehicle transceiver. A user interface has at least one translucent key switch to contact the transceiver switch and thereby activate transmission of the data signal. A light source is provided beneath the translucent key switch to illuminate the translucent key switch when the acknowledgement signal has been received. Control circuitry is adapted to receive a command from the translucent key switch when it is depressed, retrieve the control data from the storage module, and provide the control data to the transceiver switch for transmission as the data signal, and to cause the light source to illuminate when the acknowledgement signal has been received.

16 Claims, 7 Drawing Sheets

U.S. PATENT DOCUMENTS

| | | |
|---|---|---|
| 6,696,927 B2 | 2/2004 | Flick |
| 6,703,946 B2 | 3/2004 | Flick |
| 6,737,989 B2 | 5/2004 | Flick |
| 6,741,187 B2 | 5/2004 | Flick |
| 6,744,384 B2 | 6/2004 | Flick |
| 6,756,885 B1 | 6/2004 | Flick |
| 6,756,886 B2 | 6/2004 | Flick |
| 6,765,499 B2 | 7/2004 | Flick |
| 6,765,500 B2 | 7/2004 | Flick |
| 6,771,167 B1 | 8/2004 | Flick |
| 6,771,188 B2 | 8/2004 | Flick |
| 6,784,809 B2 | 8/2004 | Flick |
| 6,791,449 B2 * | 9/2004 | Dewan .................. 340/5.25 |
| 6,798,355 B2 | 9/2004 | Flick |
| 6,798,356 B2 | 9/2004 | Flick |
| 6,803,861 B2 | 10/2004 | Flick |
| 6,804,605 B2 | 10/2004 | Flick |
| 6,809,659 B2 | 10/2004 | Flick et al. |
| 6,812,829 B1 | 11/2004 | Flick |
| 6,816,089 B2 | 11/2004 | Flick |
| 6,819,269 B2 | 11/2004 | Flick |
| 6,844,827 B2 | 1/2005 | Flick |
| 6,873,824 B2 | 3/2005 | Flick |
| 6,888,495 B2 | 5/2005 | Flick |
| 6,924,750 B2 | 8/2005 | Flick |
| 6,972,667 B2 | 12/2005 | Flick |
| 6,980,095 B2 * | 12/2005 | Wright et al. .......... 340/426.36 |
| 7,015,830 B2 | 3/2006 | Flick |
| 7,021,810 B2 | 4/2006 | Hoffman |
| 7,031,826 B2 | 4/2006 | Flick |
| 7,031,835 B2 | 4/2006 | Flick |
| 7,034,657 B2 | 4/2006 | Ueda et al. |
| 7,109,908 B2 * | 9/2006 | Griesau et al. ............ 341/176 |
| 2004/0118916 A1 * | 6/2004 | He ........................... 235/383 |

* cited by examiner

CONTROL DEVICE FOR VEHICLES

CROSS-REFERENCE TO RELATED APPLICATIONS

This is the first application filed for the present invention.

TECHNICAL FIELD

The present invention relates to the field of remote motor vehicle starter systems, and more particularly, to the user interface of the remote control and the communication between the transmitter and the receiver.

BACKGROUND OF THE INVENTION

Most vehicles now come standard with a remote control device, and the capabilities of that device are quickly growing. It can lock and unlock doors, open the trunk, start and stop the engine, roll up and down the windows, etc.

One problem commonly associated with such a device is the confirmation that the command has been properly received by the vehicle. If a user activates the device from inside a house and is not within visual distance from the vehicle, he or she cannot see whether the vehicle has been started or not. Some manufactures of these devices solve this problem using flashing Light Emitting Diodes (LEDs) on the remote control device. However, having a single LED on the device that flashes as a confirmation that an acknowledgement signal has been received from the in-vehicle transceiver merely confirms that a signal has been received, not which one has been received. If the user has pushed the wrong button and unlocked the doors instead of starting the engine, the LED lights up to confirm that the vehicle had received a command. The user will never know, until reaching the vehicle, that the wrong signal has been sent. Alternatively, having a separate LED associated with each command on the device increases the required electronics and crowds the device. It is desirable to keep the device as small as possible, given that it is often carried around in a pocket or a purse and attached to a set of keys.

Another problem associated with this type of device is in receiving the confirmation signal. The handheld device transmits a signal while the user has his finger pressed on the command button and listens for a confirmation or acknowledgement signal after the button is released. The in-vehicle transceiver is designed such that it cannot receive the transmitted signal until the button is released. The handheld transceiver is designed to listen for a fixed time period, such as two seconds, for the confirmation signal. If the confirmation signal is not received within the 2 seconds, the user will not know whether the command has been received or not. The process must then be repeated until a confirmation is received. However, the first transmission may have been successful even if the confirmation signal was not received. A second press of the button may then cause the engine that was started by the first command to stop. The user would then think that the vehicle has been started when in fact, it has not.

Therefore, there is a need to improve the present remote control devices for vehicles to remediate the problems that exist with respect to receiving the confirmation signals, and informing the user of such a reception.

SUMMARY OF THE INVENTION

It is an object of the invention to provide an improved remote control device for vehicles.

In accordance with a first broad aspect of the present invention, there is provided a remote controller for a vehicle, the remote controller comprising: a storage module for storing control data to be transmitted to an in-vehicle transceiver; a transceiver switch having a transmit mode to transmit a data signal to the in-vehicle transceiver and a receive mode to listen for an acknowledgement signal from the in-vehicle transceiver; a user interface having at least one translucent key switch to contact the transceiver switch and thereby activate transmission of the data signal; a light source beneath the translucent key switch to illuminate the translucent key switch when the acknowledgement signal has been received; and control circuitry adapted to receive a command from the translucent key switch when it is depressed, retrieve the control data from the storage module, and provide the control data to the transceiver switch for transmission as the data signal, and to cause the light source to illuminate when the acknowledgement signal has been received.

In accordance with a second broad aspect of the present invention, there is provided a method for transmitting a data signal from a handheld transceiver to a vehicle, the method comprising: providing in the vehicle a remote starter module having an in-vehicle transceiver; providing the handheld transceiver with a user interface having at least one key switch to activate transmission of the data signal; exerting pressure on the key switch to cause a transceiver switch in the handheld transceiver to toggle between a transmit mode and a receive mode, wherein the data signal is transmitted from the handheld transceiver to the in-vehicle transceiver while the transceiver switch is in the transmit mode, and the handheld transceiver listens for an acknowledgement signal from the in-vehicle transceiver when the transceiver switch is in the receive mode; and releasing pressure on the key switch, thereby placing said transceiver switch in the receive mode for a predetermined amount of time.

The present invention simplifies the use of remote control devices for vehicles. The user knows to keep exerting pressure on the key switch until the handheld device beeps. Once the beep is heard and the key switch is released, the flashing LED confirms that the proper command has been sent and received to the vehicle.

In addition, the chances of receiving the confirmation signal on a first try are increased because the listening time of the handheld device is greater than in the prior art systems.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
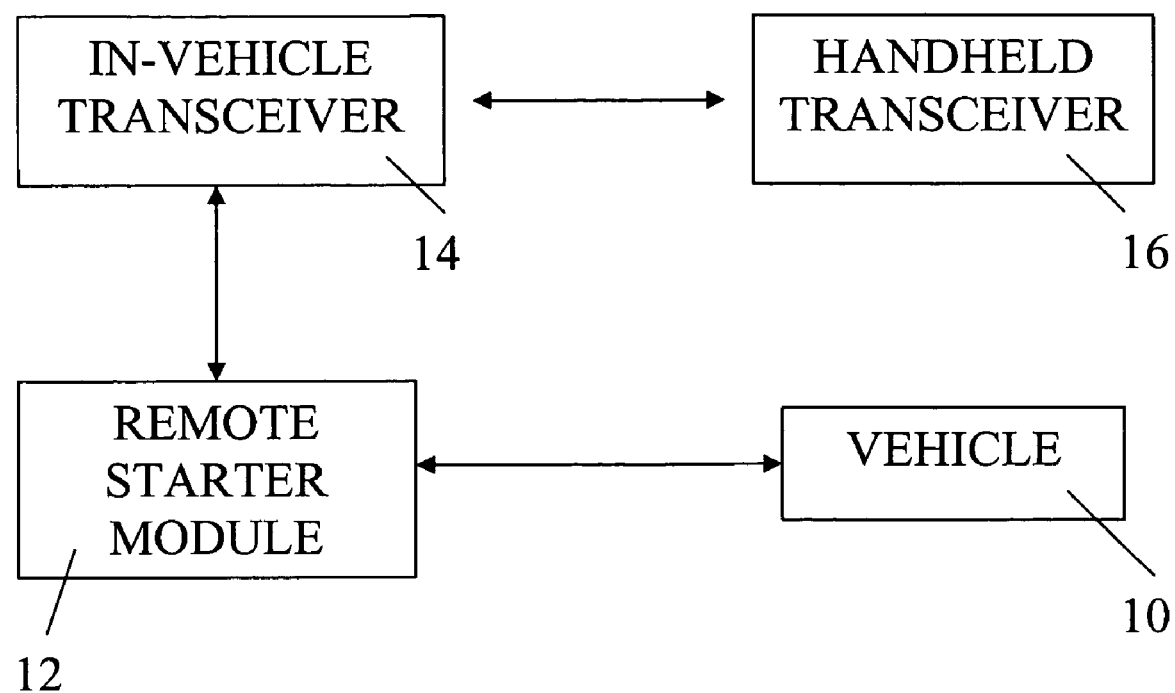
FIG. 1 is a block diagram of a system including the handheld transceiver and the in-vehicle transceiver in accordance with a preferred embodiment of the present invention.

FIG. 1 illustrates the full system of the present invention as per the preferred embodiment. A vehicle 10 is provided with a remote starter module 12. The remote starter module 12 is hardwired to the vehicle 10. It can also be connected to the data communication bus of a vehicle 10 without necessarily being hardwired directly to specific components of the vehicle 10. The remote starter module 12 has a wired connection to an in-vehicle transceiver 14. The in-vehicle transceiver 14 is a two-way communication device that can send and receive Radio Frequency (RF) signals. Specifically, the in-vehicle transceiver 14 communicates with a handheld transceiver 16, which is in the remote control device used to send command signals to the vehicle 10 and is also a two-way communication device.

Figure 2:
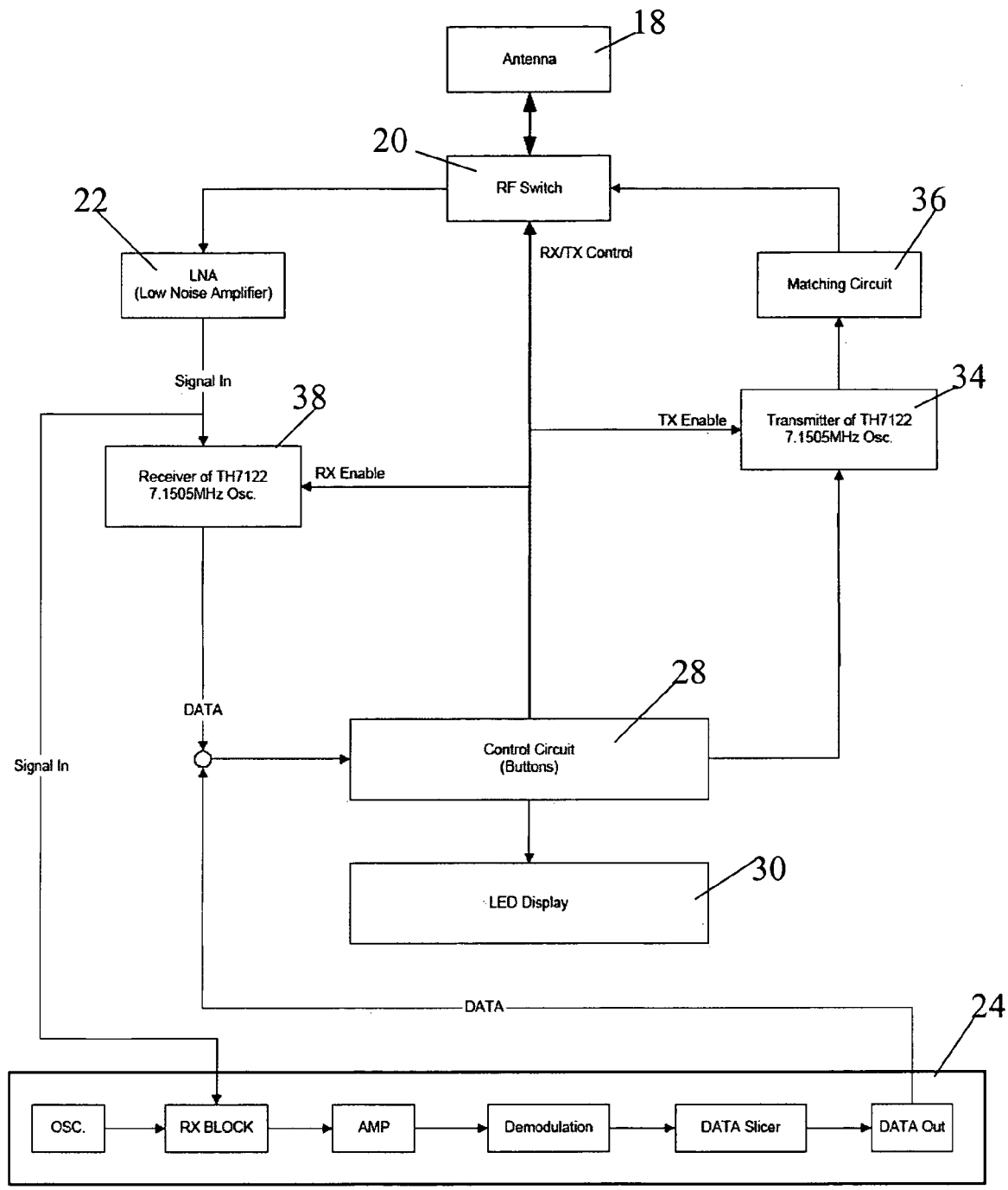
FIG. 2 is a block diagram of the handheld transceiver in accordance with a preferred embodiment of the present invention.

FIG. 2 is a block diagram illustrating the components of the handheld transceiver 16. An antenna 18, used to transmit and receive the radio signals, is connected to an RF switch 20. The RF switch 20, when activated, places the device in one of a transmit mode or a receive mode. In transmit mode, the device sends data signals to the in-vehicle transceiver. In receive mode, the device listens for a signal sent by the in-vehicle transceiver. The RF switch 20 is connected to a low noise amplifier (LNA) 22 which is used to power-up the device and receives a data signal from the RF switch 20. The LNA 22 transmits the received signal to a receiver 38, which converts the input radio-frequency signal into an intermediate frequency signal, and also to a signal-in receiver 24, where the signal is demodulated and processed into a digital signal. The signal is then combined with the output from the receiver 38 and sent to a control circuit 28. This circuit 28 is connected to the LED Display block 30, to instruct it to illuminate when a confirmation signal has been received. The Transmitter block 34 is connected to a matching circuit 36, which is also connected to the RF switch 20.

Figure 3A:
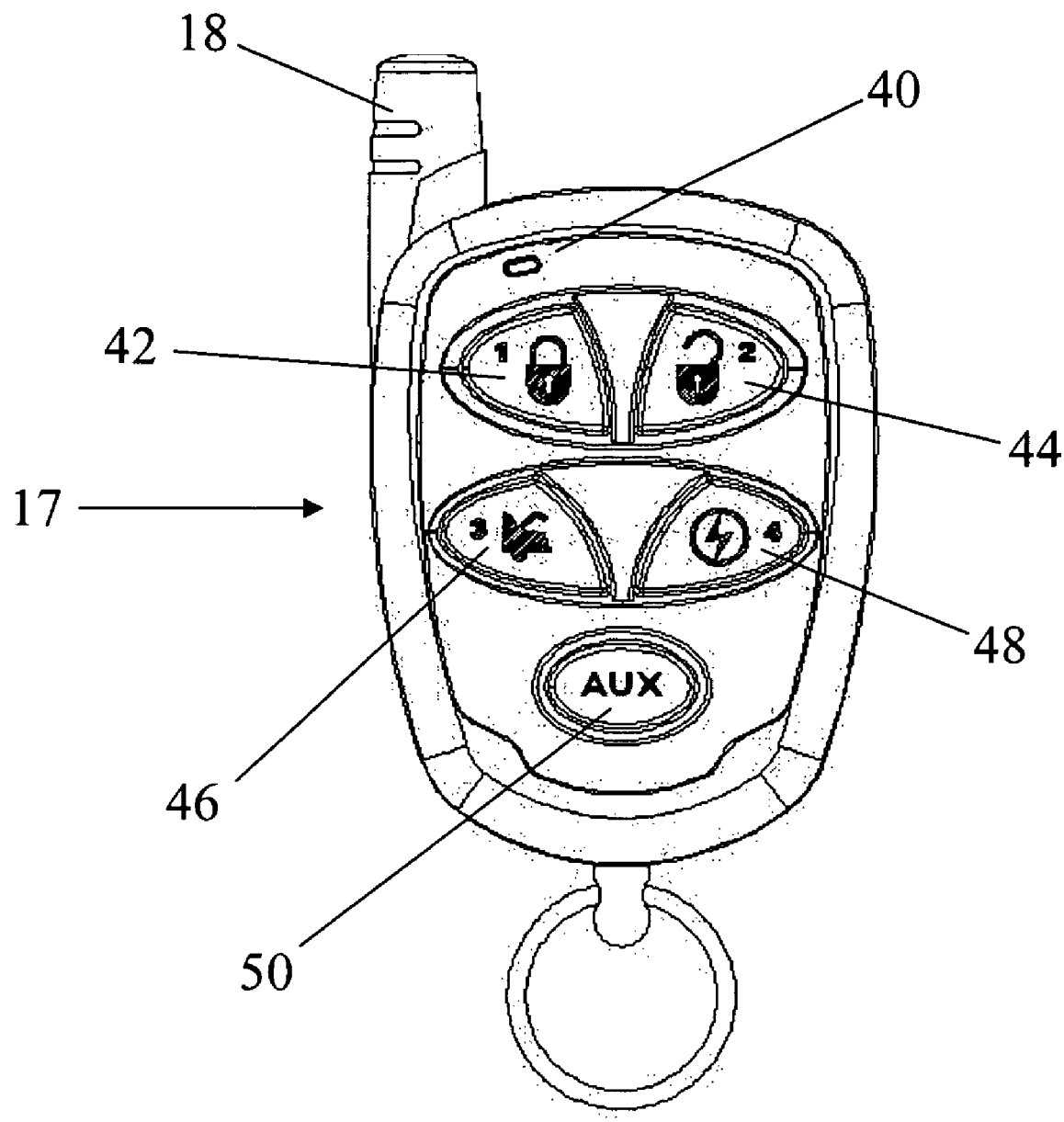
FIG. 3a is a front view of the handheld remote control device in accordance with a preferred embodiment of the present invention.

FIG. 3a is a front view of the remote control device of the preferred embodiment of the present invention. The device 17 has an antenna 18 formed as part of the casing. A blue LED 40 flashes while data is being transmitted from the device 17 to the in-vehicle transceiver 14. Four translucent key switches 42, 44, 46, 48 are used to activate transmission of data and send a command having a distinct function. Each key switch has a symbol or icon on it to illustrate its primary function (the symbols in the figure are purely for illustration purposes). Key switch 42 is to lock the doors, key switch 44 is to unlock the doors, key switch 46 opens the trunk, and key switch 48 starts and stops the engine of the vehicle 10. Additionally, an auxiliary key switch 50 is used as a shift key in combination with one or more of the other key switches to provide additional functions, such as a status request, opening and closing of windows, valet mode, cold weather mode, priority door access, home valet, panic mode, etc. Using the auxiliary key switch 50, an extra 12 functions can be programmed into the device, for a total of 16 different functions. The auxiliary key switch 50 is also used to program the different functions for the other keys.

Figure 3B:
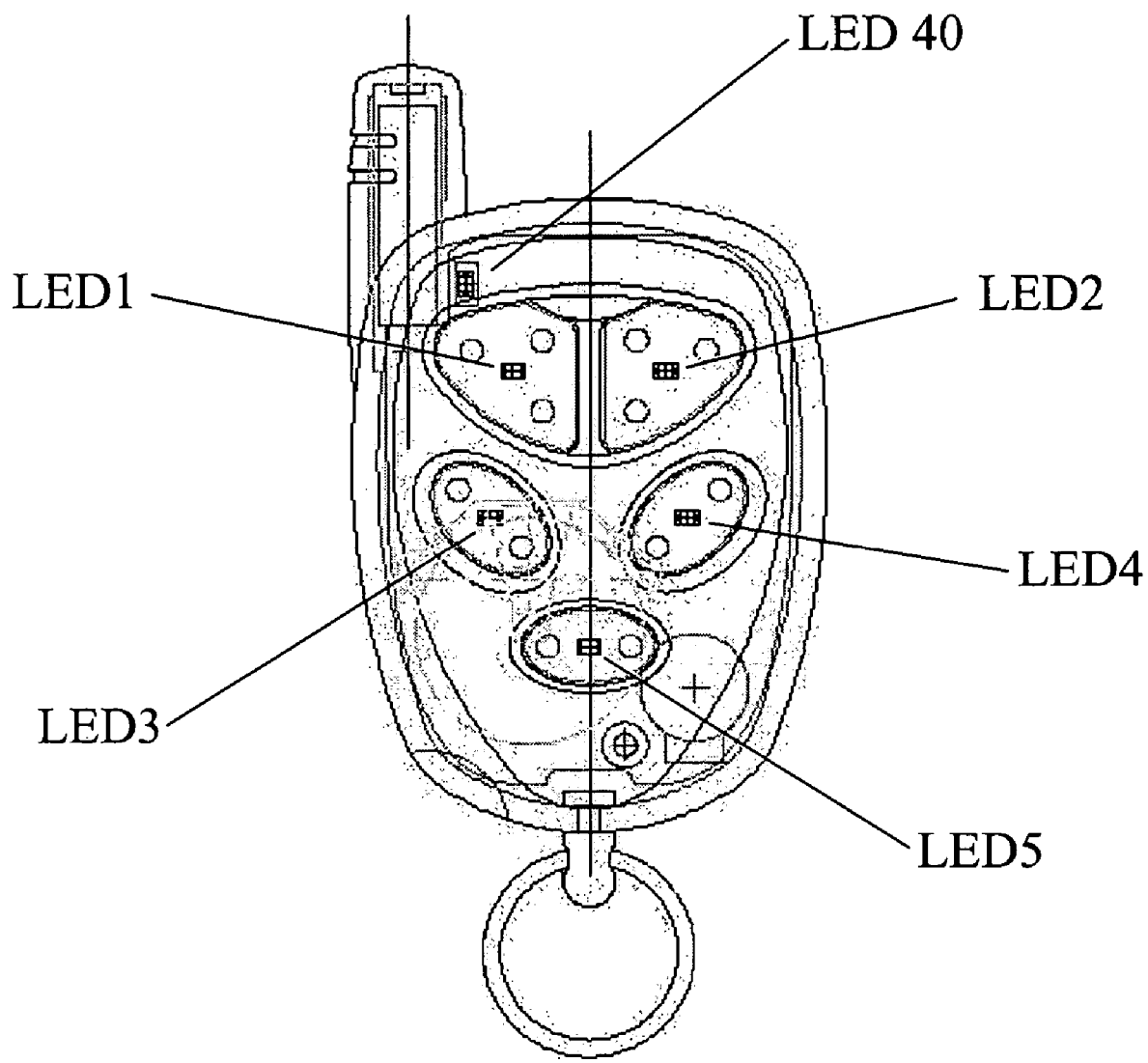
FIG. 3b is a schematic view of the light sources beneath the key switches of the handheld remote control device in accordance with a preferred embodiment of the present invention.

As shown in FIG. 3b, a light source, such as an LED (LED1, LED2, LED3, LED4, respectively) is provided underneath each translucent key switch 42, 44, 46, 48 and it illuminates (or flashes) when a confirmation signal has been received from the in-vehicle transceiver 14 to acknowledgement reception of the initial command signal. For example, if the door lock key 42 is pressed, the blue LED 40 illuminates to show the door lock command is being sent to the vehicle 10. When the door lock key 42 is released, the LED underneath it (LED1) flashes to show that the vehicle has received the command and the doors have been locked. An LED (LED4) can also be provided beneath the auxiliary key switch 50. Additionally, in a preferred embodiment, the device 17 also beeps after the signal has been sent and the acknowledgement signal has been received to inform the user that the key switch can be released. Each key switch may be programmed with a different combination of beeps and flashes of the LEDs. Such combinations are illustrated in FIGS. 4a-4f.

Figure 4A:
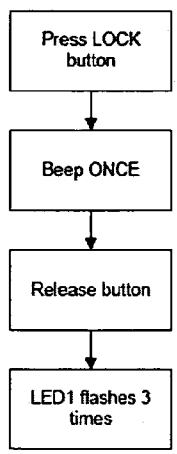
FIGS. 4a-4f are multiple flowcharts of various functions of the handheld transceiver in accordance with a preferred embodiment of the present invention.
Figure 4B:
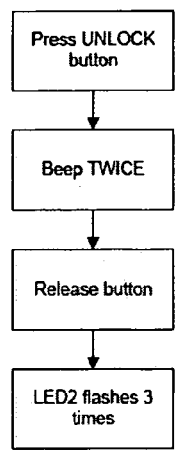
Figure 4C:
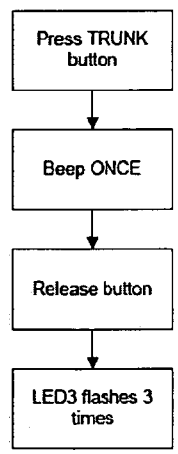
Figure 4D:
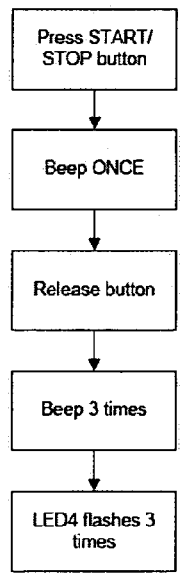

FIG. 4a is a sample flowchart for locking the doors of the vehicle and obtaining a quick status. The lock button 42 is pressed, the device beeps once, the button is released, and LED1 flashes three times. FIG. 4b shows a procedure for unlocking the doors. The unlock key 44 is pressed, the device beeps twice, the button is released, and LED2 flashes three times. FIG. 4c shows a procedure for opening the trunk. The trunk key 46 is pressed, the device beeps once, the button is released, and LED3 flashes three times. FIG. 4d illustrates a procedure for starting the engine of the vehicle. The start/stop button 48 is pressed, the device beeps once, the button is released, the device beeps three times, and LED4 flashes three times.

Figure 4E:
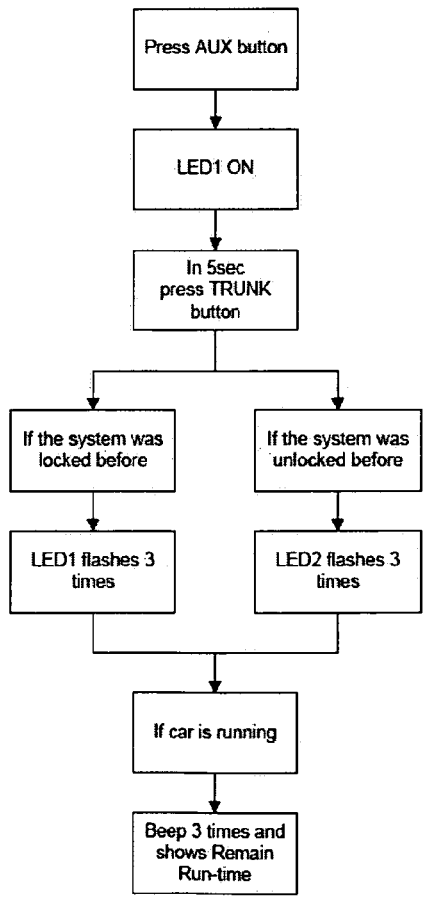
Figure 4F:
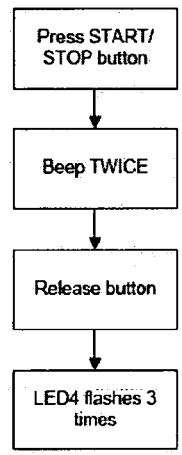

FIG. 4e illustrates a sample procedure for obtaining a status request. The auxiliary key 50 is pressed and LED1 turns on. Within 5 sec, the trunk key 46 is pressed. If the system was locked, LED1 flashes 3 times. If the system was unlocked, LED2 flashes 3 times. If the car is running, the device beeps 3 times. FIG. 4f illustrates a procedure for stopping the car engine. The start/stop button is pressed, the device beeps twice, the button is released, and LED4 flashes 3 times. Various combinations of flashing LEDs and beeping can be used to distinguish the different functions of the device.

Figure 5:
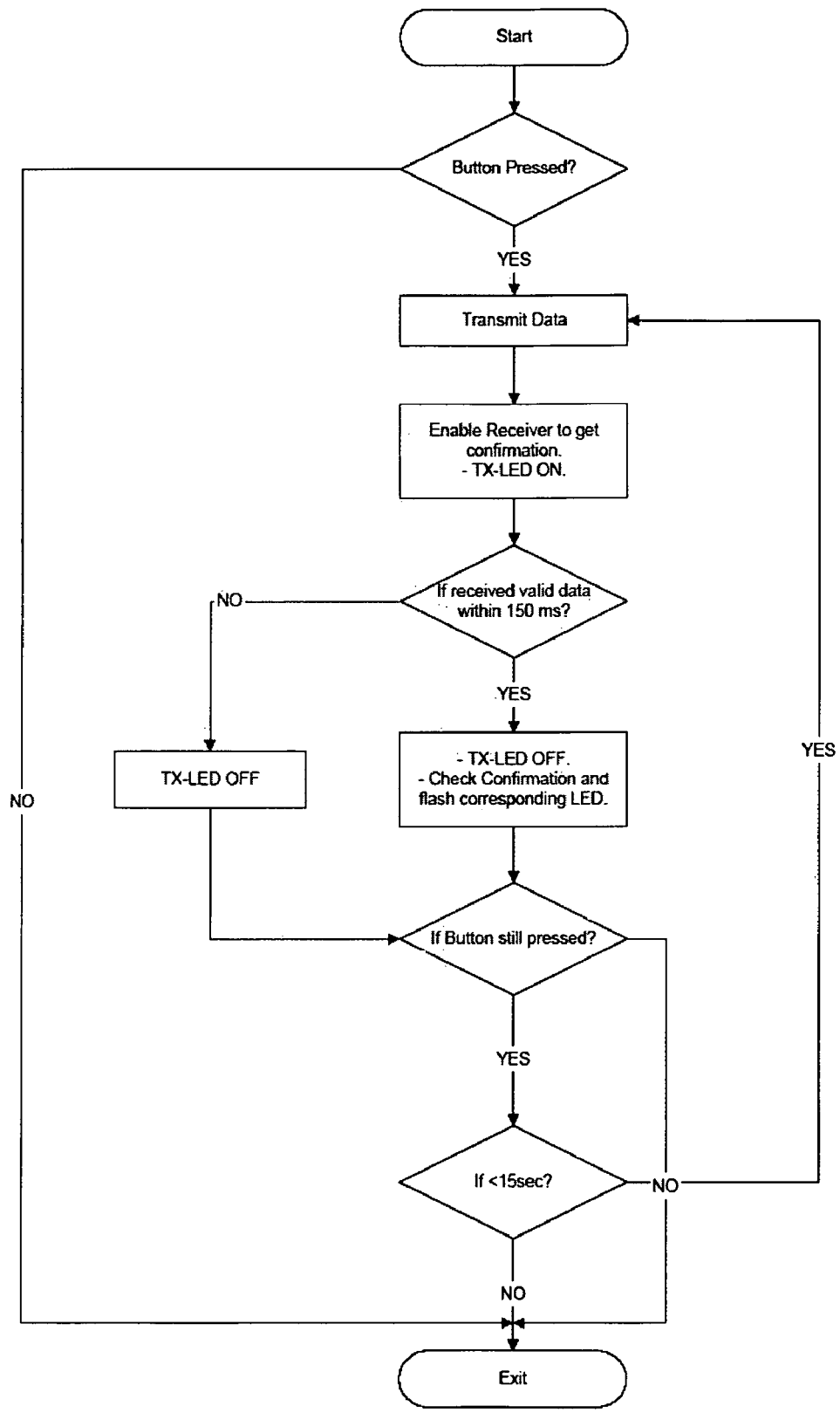
FIG. 5 is a flowchart of the process of the handheld transceiver in accordance with a preferred embodiment of the present invention.

FIG. 5 is a flowchart of the decision-making process used by the handheld transceiver as per the preferred embodiment. If a button is pressed, this indicates that data is to be transmitted, which means the transmission LED is lit and the receiver is enabled to receive a confirmation. If valid data is received within 150 ms, the transmission LED is turned off and the LED beneath the button that was pressed is flashed. If valid data is not received within 150 ms, the system determines if the button is still pressed. If not, the process starts all over again when the button is pressed a second time. If so and the time elapsed is less than 15 seconds, the data is transmitted again automatically. If the time elapsed is more than 15 seconds, the state of the button is again evaluated and the process begins again when the button is pressed.

Figure 6:
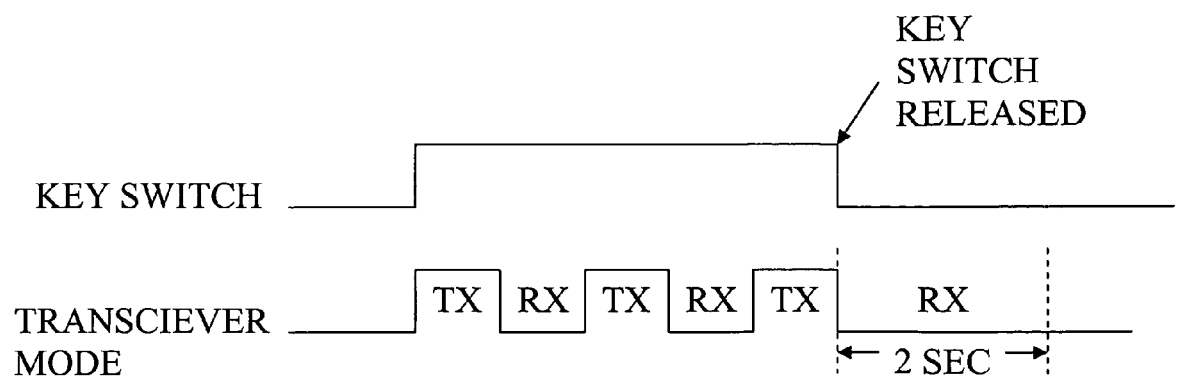
FIG. 6 is a signal diagram of the waveforms during the transmission and reception process of the handheld device.

FIG. 6 illustrates the waveforms of the transmission and reception process of the handheld device 17. While the key switch is pressed, the transceiver switch in the handheld transceiver toggles between a transmit mode and a receive mode, wherein the data signal is transmitted from the handheld transceiver to the in-vehicle transceiver while the transceiver switch is in the transmit mode, and the handheld transceiver listens for an acknowledgement signal from the in-vehicle transceiver when the transceiver switch is in the receive mode.

When the key switch is released, the transceiver either toggles to, or remains, in receive mode for an additional period of time, such as two seconds as illustrated in the figure. This half duplex mode allows the device to both send and receive information, but only in one direction at a time, and does not postpone reception by the in-vehicle transmitter to when the key switch is released. The possible reception time of the acknowledgement signal is greatly increased, thereby increasing the effectiveness of the system.

In order to save power, the toggling process is terminated as soon as the acknowledgement signal is received from the in-vehicle transceiver, even if the key switch has not been released. However, if the key switch is still pressed and the acknowledgement signal has not been received, the handheld device continues to transmit. Even if the acknowledgement signal has been transmitted by the in-vehicle transceiver, it may not have been received by the handheld transceiver due to various reasons, such as interference with the signal. The in-vehicle transceiver is designed to retransmit the acknowledgement signal if it receives the original transmission a second time.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

The embodiments of the invention described above are intended to be exemplary only. The scope of the invention is therefore intended to be limited solely by the scope of the appended claims.

I claim:

1. A remote controller for a vehicle, the remote controller comprising:
    a storage module for storing control data to be transmitted to an in-vehicle transceiver;
    a transceiver switch having a transmit mode to transmit a data signal to said in-vehicle transceiver and a receive mode to listen for an acknowledgement signal from said in-vehicle transceiver;
    a user interface having at least two translucent key switches to contact said transceiver switch and thereby activate transmission of said data signal;
    at least two light sources, each beneath a corresponding one of said at least two translucent key switches to illuminate said corresponding one of said at least two translucent key switches only when said acknowledgement signal has been received and said corresponding one of said at least two translucent key switches has been released, thereby confirming that said acknowledgement signal has been received and which one of said at least two translucent key switches was depressed; and
    control circuitry adapted to receive a command from one of said at least two translucent key switches when it is depressed, retrieve said control data from said storage module, and provide said control data to said transceiver switch for transmission of said data signal, and to cause, a corresponding one of said at least two light sources to illuminate only when said acknowledgement signal has been received and said one of said at least two translucent key switches has been released.

2. A remote controller as claimed in claim 1, wherein said at least two light sources are light emitting diodes (LEDs).

3. A remote controller as claimed in claim 2, wherein each one of said LEDs flashes a predetermined number of times when said acknowledgement signal is received.

4. A remote controller as claimed in claim 2, wherein each one of said LEDs only flashes after said corresponding one of said at least two translucent key switches is released.

5. A remote controller as claimed in claim 1, wherein said user interface comprises a secondary light source that illuminates when said data signal has been transmitted.

6. A remote controller as claimed in claim 1, wherein said control circuitry causes an audio sound to be emitted from said remote controller when said acknowledgement signal has been received.

7. A remote controller as claimed in claim 1, wherein said user interface comprises four translucent key switches, each one having a programmed functionality.

8. A remote controller as claimed in claim 1, wherein said transceiver switch toggles between said transmit mode and said receive mode while one of said at least two key switches is depressed.

9. A method for transmitting a data signal from a handheld transceiver to a vehicle, the method comprising:
    providing in said vehicle a remote starter module having an in-vehicle transceiver;
    providing said handheld transceiver with a user interface having at least two key switches to activate transmission of said data signal, each one of said at least two key switches having a translucent cover and a light source beneath said translucent cover;
    exerting pressure on one of said at least two key switches to cause a transceiver switch in said handheld transceiver to toggle between a transmit mode and a receive mode, wherein said data signal is transmitted from said handheld transceiver to said in-vehicle transceiver while said transceiver switch is in said transmit mode, and said handheld transceiver listens for an acknowledgement signal from said in-vehicle transceiver when said transceiver switch is in said receive mode;
    releasing pressure on said one of said at least two key switches, thereby placing said transceiver switch in said receive mode for a predetermined amount of time; and
    illuminating said light source located beneath said one of said at least two key switches upon said releasing pressure on said one of said at least two key switches only if said acknowledgement signal has been received, thereby confirming that said acknowledgement signal has been received and which one of said at least two key switches was depressed.

10. A method as claimed in claim 9, wherein said toggle process is terminated when said handheld transceiver receives said acknowledgement signal from said in-vehicle transceiver.

11. A method as claimed in claim 9, wherein said predetermined amount of time is two seconds.

12. A method as claimed in claim 9, wherein said data signal is a door lock signal.

13. A method as claimed in claim 9, wherein said data signal is an engine start signal.

14. A method as claimed in claim 9, wherein said handheld transceiver provides an audio signal when said acknowledgement signal is received.

15. A method as claimed in claim 9, wherein said light source is a light emitting diode.

16. A method as claimed in claim 9, wherein said light source is programmed to flash a predetermined number of times, said number of times being indicative of a type of signal data.

* * * * *